Sept. 1, 1970 W. S. LIVINGSTON 3,526,697
THERAPEUTIC METHOD
Filed Oct. 6, 1966

INVENTOR.
WILLIAM STEELE LIVINGSTON
BY
*Lyon & Lyon*
ATTORNEYS

United States Patent Office 3,526,697
Patented Sept. 1, 1970

3,526,697
THERAPEUTIC METHOD
William Steele Livingston, Woodland Hills, Calif., assignor to Nevada Pharmaceuticals, Inc., Van Nuys, Calif., a corporation of Nevada
Continuation-in-part of application Ser. No. 207,146, June 26, 1962, which is a continuation-in-part of applications Ser. No. 655,320, Apr. 26, 1957, and Ser. No. 660,559, May 21, 1957, which are continuations of application Ser. No. 623,711, Nov. 21, 1956, which in turn, is a continuation-in-part of application Ser. No. 256,334, Nov. 14, 1951, which also in turn, is a continuation of application Ser. No. 127,799, Nov. 16, 1949. This application Oct. 6, 1966, Ser. No. 602,434
Int. Cl. A61k 17/00
U.S. Cl. 424—105                              18 Claims The application is a continuation-in-part of my copending application Ser. No. 207,146 filed June 26, 1962 which was continuation-in-part of my applications Ser. No. 660,559, filed May 21, 1957 and Ser. No. 655,320, filed Apr. 26, 1957, which, in turn, was a continuation-in-part of my application Ser. No. 623,711 filed Nov. 21, 1956, which, in turn, was a continuation-in-part of my application Ser. No. 256,334 filed Nov. 14, 1951, which, in turn, was a continuation-in-part of my application Ser. No. 127,799 filed Nov. 16, 1949, all prior applications being now abandoned.

This invention relates to a process which is effective against arthritis and has tumor growth inhibitory action and which has been proven to be useful in the treatment of mammals such as household pets, e.g., dogs and cats.

The general background relating to the present invention is set forth in Livingston et al., The Treatment of Spontaneous Tumors of the Dog and Cat with a Filtrate from a Tissue Lysate, Journal of the National Cancer Institute, vol. 20, No. 2, February 1958 and Livingston et al., Growth Inhibition of Transplanatable Mouse Lymphosarcoma by a Filtrate from Placental Lysates, Journal of the National Cancer Institute, vol. 23, No. 3, September 1959, both of which are incorporated herein by reference.

It is an object of this invention to provide a process for the production of a therapeutically effective product, wherein micro-organisms and/or animal tissues are incubated under superatmospheric pressure for prolonged periods of time.

Other objects and advantages of this invention, it is believed, will be readily apparent from the following detailed description of preferred embodiments thereof when read in connection with the accompanying drawings.

Figures 1, 2:
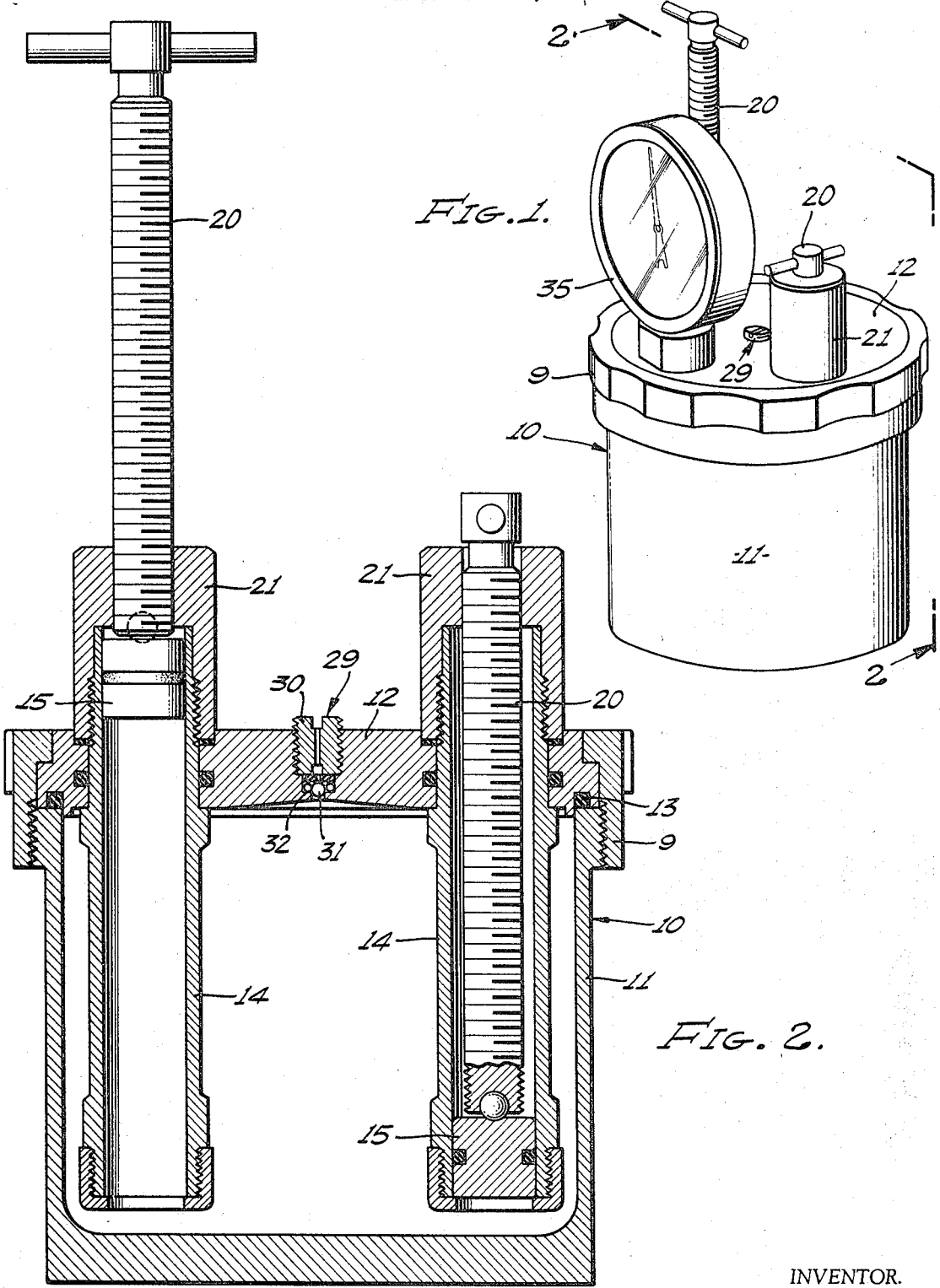
FIG. 1 is a perspective view illustrating the apparatus used in carrying out the process of this invention.
FIG. 2 is a vertical sectional view taken on the line 2—2 of FIG. 1.

Briefly, this invention comprehends within its scope the discovery that a therapeutically active product can be obtained by incubating animal tissue bacteria or yeast for prolonged periods under superatmospheric pressures. The material subjected to the superatmospheric pressure may comprise a combination of animal tissue and bacteria or animal tissue and yeast. Best results are obtained under aseptic conditions, but active material can be produced in the presence of microorganisms, i.e., in the absence of antibacterial preservatives. As used herein, the term "animal tissue" is intended to means and include normal and malignant tissues and glands of animals and man, including but not limited to the liver, kidneys, spleen, pituitary bodies, pancrease, removed either surgically or at postmortem from any normal or tumor-bearing animal or man, or embryo tissues such as the placenta of animals or man.

The method by which the autolysate of this invention achieves its effectiveness has not been completely established. The following explanation is set forth in order to aid in understanding the invention. However, I do not intend to be bound by the following explanation, and include it to only as a possible explanation of the utility of the invention.

The explanation is based on the concept that the enzymes of mammalian, bacterial, fungi and yeast cells undergoing autolysis, produce substances which influence the chemical processes of the living organism. Cells within the living organism die and undergo autolysis constantly. Also, there is evidence suggesting that the death and lysis of cells during embryological development influence the orderly development of the embryo. Thus, it seems reasonable to assume that the products of cellular autolysis serve some useful function to the growing and adult organism. My hypothesis, which is based on information obtained from work that we have conducted at the universities, pharmaceutical firms, and my own laboratory, suggests that products of cellular autolysis influence the autoimmune mechanism. Studies that have been conducted suggest that some of the products of cell autolysis stimulate the organism into producing blocking or inhibiting antibodies which inactivates or neutralize the autoimmune mechanism. It is believed among a number of rheumatologists and immunologists that the systemic rheumatic diseases are autoimmune diseases. Furthermore a great many cancer investigators believe the neoplastic diseases are autoimmune diseases.

The incubation can be carried out under either aerobic or anaerobic conditions, but the use of superatmospheric pressure is an essential feature of the invention. It has been found that when using human placenta as the raw material, the pressure is quite critical and should be maintained within about 23 and about 37 pounds per square inch (gauge). Wider deviations above and below the optium pressure of 35 p.s.i.g. are possible, depending upon the raw material and the desired potency of the end product, but generally the pressure should be maintained within the range or 15–100 p.s.i.g. Especially good results are obtained by removing all air and carrying out the incubation in a reducing atmosphere of hydrogen, hydrocarbon gases, methyl mercaptan, other reducing gases, and mixtures thereof.

The preferred temperature of incubation is 40° C., but satisfactory results may be obtained within the range of about 35° C. to about 55° C.

Another important condition of the incubation reaction is the time period. It has been found that prolonged incubation is necessary to obtain a satisfactorily active product. Generally, the reaction should be permitted to proceed for at least two or three weeks, with maximum yield of active therapeutic substance being obtained at three months. Longer periods of incubation of up to a year have not increased or decreased the product potency.

The conditions of pH during the process are not critical and need no artificial adjustment, but it is important to carefully regulate the pH to about 8 prior to incubation at pressures of about 35 p.s.i. On the other hand, active material has been produced at varying artificially adjusted pH's, both above and below 7.

Following the pressure incubation period, the raw product may be filtered to separate the clear filtrate containing the active material. However, surprisingly potent products are produced by first boiling the raw product for a length of time to coagulate liquid proteinaceous material therein.

Aseptic conditions are most satisfactorily maintained by the use of a preservative such as chloroform, toluene or other aromatic compounds or combinations thereof, or an antibiotic such as penicilin, crystacillin, streptomycin, aureomycin, terramycin, acromycin, chloromycetin, and mixtures thereof.

When operating without any antibacterial preservatives when using tissue as the raw material, chance bacterial contamination is inevitably present. In the case of human placenta, the chance bacteria normally present was found ot be *Escherichia coli* and *Proteus volgaris.*

Referring now to the drawings, these illustrate an apparatus suitable for carrying out the incubation process of the present invention. The apparatus comprises a pressure vessel 10, preferably of stainless steel. The vessel includes a generally cylindrical body 11 of about 750 cc. capacity, closed at the bottom and having an open top to which is affixed, by means of a threaded ring 9, a cover member 12 provided with a suitable seal 13. A pair of cylinders 14 are carried by the cover member and extend downwardly into the interior of the body 11, each of the cylinders being priovided with a piston 15 adapted to be raised and lowered within the cylinders by means of screw members 20 threadedly engaged in cap members 21 fitted on the upper ends of the cylinders.

Means are provided for releasing the pressure within the vessel and, as shown in the drawings, these means may include a valve 29 comprising a plug member 30 threadedly engaged in a central opening in the cover member 12, the plug member in the closed position shown forcing a ball 31 against its seat 32. A pressure gauge 35 is inserted into the cover member to complete the assembly.

The following specific examples are illustrative of preferred embodiments of the invention, but it is to be understood that the invention is not to be limited thereto:

EXAMPLE 1

Fresh human placentas were obtained in a sterile metal container from the delivery room using ordinary sterile precautions. No antibacterial preservatives were added, however.

The placenta was ground in a meat grinder and 500 grams placed in the pressure vessel with 150 cc. of 0.9% sterile saline. The cover member of the vessel was then put into placttand sealed. The internal pressure was then regulated ot 25 p.s.i.g. by lowering the pistons 15 by means of the screw members 20, and the entire vessel and contents placed in a hot air incubator at 40° C.

During the entire period of incubation the internal pressure was maintained at 25 p.s.i.g. As bacterial fermentation commenced, with the evolution of gases, the screw members were gradually raised to maintain the pressure equilibrium. After about 72 hours, sufficient gas had evolved by fermentation to require release thereof by opening of the valve 29. Sufficient gas was released to bring the pressure below 25 pounds, and the pressure again brought back to that value by adjustment of the pistons 15. Pressure adjustments in this manner were made every one-half hour during the waking period and at four-hour intervals during the night.

Incubation in this manner was continued for three months, at which time the vessel was opened. The contents were extremely odiferous, cream-like in consistency, and had the color of port wine. The pH was found to be 6.8.

The semi-liquid raw product was strained through unbleached muslin previously washed to remove sizing. The liquid was then passed through coarse filter paper (aloe 42,700) four times through the same sheet to produce a clear filtrate. The liquid was then sterilized by filtration through a 100 cc. Seitz filter flash using type ST-3, size L-6 filter pads, with a porosity of 0.1. Approximately 450 cc. of filtrate was obtained. This filtrate was then drawn through sterile tubing into previously evacuated sterile rubber capped bottles and was ready for use. Storage of the product in a cold room at 3° C. will preserve it for periods of a week or longer.

EXAMPLE 2

Fresh human placentas were obtained in a sterile metal container from the delivery room using ordinary sterile precautions. The placentas were ground in a meat grinder and 500 grams thereof placed in the pressure vessel with 200 cc. of 0.9% sterile saline, 310,000 units of penicillin, 0.210 gram of streptomycin and 0.310 gram of chloromycetin. The pH of the admixture was adjusted to 7.8 with 5 N NaOH and the admixture was equilibrated for about 1 hour. The pH was readjusted to 7.8 and equilibrated in this manner twice more, whereupon the vessel was covered and sealed. The vessel was provided with an adapter (not shown), comprising a threaded tube replacing the valve 29, the tube being threaded into the central opening in the cover 12 and extending outwardly therefrom. A rubber tubing (not shown) is affixed to the end of the tube and provided with suitable clamps (not shown).

The sealed vessel was turned upside down and shaken to transfer all air out of the cylinders and into the space between the level of the admixture and the inverted bottom of the vessel, whereupon the air was evacuated by attaching a vacuum pump inlet line (not shown) to the tube by means of the rubber tubing described above. The inverting, shaking and evacuation steps were done twice and then hydrogen gas was introduced through the rubber tubing and tube until the pressure on the gauge was about 27 p.s.i. The rubber tubing was then clamped off and the vessel and contents placed in a hot air incubator at a temperature of 47° C. After a short time at this temperature, the gauge pressure rose to 35 p.s.i. Incubation was carried on for six weeks, during which it was necessary every week to regulate the pressure to maintain it at 33–35 p.s.i. by inward adjustment of the pistons 15.

After incubation as described, the vessel was opened, the product therein being a dark red in color, with little or no odor, partly liquified but containing a considerable quantity of solids, and having a pH of 6.6.

The pH was adjusted to 7.4 by the slow addition of 5 N NaOH with stirring and the admixture was boiled in a stainless steel pan over an open flame for about 10 minutes. The pH of the cooled admixture was 7.6; it was dark brown in color and it had a considerably increased solids content due to coagulation of liquid, heat unstable proteins during the boiling step. The admixture was clarified and filtered as in Example 1 and was then lyophilized and stored ready for reconstitution and use. Starch block electrophoresis of the product indicated that the active material comprises fractions in the areas of electrophoretic mobility corresponding to $a_1$ and $a_2$ globulins.

EXAMPLE 3

The process of this example was substantially identical to that of Example 1 except that horse sarcoma was substituted for the placenta as the raw material.

EXAMPLE 4

The process of this example was substantially identical to that of Example 1 except that here the process was carried out under anaerobic conditions. In this connection, the saline was boiled to remove oxygen and then cooled prior to introduction into the pressure vessel. After filling, the pressure vessel was rotated in such a way as to release all air from the cylinders 14 and to cause the air to travel toward the valve 29. The plug 30 and the ball 31 were then removed and all air replaced with boiled saline added by means of a syringe.

EXAMPLE 5

The process of this example was substantially identical to the process of Example 1, except that about 700 cc. of Difco's thioglycolate broth was substituted for the placenta, the broth was seeded with 5 cc. of thioglycolate broth grown (120 hours) cultures of *Serratia marcescens*, and the incubation period was six weeks.

EXAMPLE 6

The process of this example was substantially identical to the process of Example 1, except that about 700 cc. of Difco's thioglycolate broth was substituted for the placenta, the broth was seeded with 5 cc. of thioglycolate broth grown (120 hours) cultures of *Staphylococcus aureus*, and the incubation period was six weeks.

EXAMPLE 7

The process of this example was substantially identical to the process of Example 1, except that about 700 cc. of Difco's thioglycolate broth was substituted for the placenta, the broth was seeded with 5 cc. of thioglycolate broth grown (120 hours) cultures of *Streptococcus crysipilatus*, and the incubation period was six weeks.

EXAMPLE 8

The process of this example was substantially identical to the process of Example 1, except that about 700 cc. of Difco's thioglycolate broth was substituted for the placenta, the broth was seeded with 5 cc. of thioglycolate broth grown (120 hours) cultures of *Escherichia coli* and the incubation period was six weeks.

EXAMPLE 9

The process of this example was substantially identical to the process of Example 1, except that about 700 cc. of Difco's thioglycolate broth was substituted for the placenta, the broth was seeded with 5 cc. of thioglycolate broth grown (120 hours) cultures of *Bacillus subtilies*, and the incubation period was six weeks.

EXAMPLE 10

The process of this example was substantially identical to the process of Example 1, except that to the placenta and saline was added 200,000 units of penicillin, 0.2 gram of dihydrostreptomycin and 15 gm. of baker's yeast. An active substance was obtained.

Any of the thioglycolate broths disclosed in the Difco Manual, 9th ed. (1935), pp. 195–200, Difco Labs, Inc., Detroit, Mich., may be employed in foregoing Examples 5–10 inclusive.

EXAMPLE 11

Fresh human placentas were obtained in a sterile metal container from the delivery room, using sterile precautions, and ground in a sterilized meat grinder. 500 grams of the ground material was placed in the pressure vessel with 150 cc. of 0.9% sterile saline. To this was added 10 cc. of toluene and the vessel contents were thoroughly mixed. The cover member of the vessel was then put into place and sealed. The plug member 30 and ball 31 were then removed and additional saline injected into the vessel with a syringe to displace the air trapped between the vessel contents and the cover member. The ball and plug member were then replaced, leaving about 40 cc. of air trapped in the cylinders 14.

The internal pressure in the vessel was then regulated to 25 p.s.i.g. by lowering the pistons 15 by means of the screw members, and the entire vessel and contents placed in a hot air incubator at 40° C.

During the entire period of incubation, the internal pressure was maintained at 25 p.s.i.g., any deviations in internal pressure being compensated for by gradual adjustment of the screw members to maintain the pressure equilibrium.

Incubation in this manner was continued for three months, at which time the vessel was opened. The product, cream-like in consistency and having a pH of 6.8, was separated into a liquid and a solid phase by centrifugation and the liquid phase passed through a sterilizing Sietz filter, the filtrate comprising the final product.

Products produced in accordance with the present invention have been used successfully in the treatment of animals such as pet dogs and cats suffering from spontaneous benign and malignant neoplasms. In these cases many tumors, including several that would ordinarily be expected to pursue a malignant course, have regressed completely for varying lengths of time.

The products of this invention have also proved useful in the treatment of arthritis and rheumatic diseases in humans. In the treatment of a consecutive series of 168 human patients with rheumatoid arithritis and osteoarthritis, 156 (93%) experienced a 90–95% improvement. Of the 168 cases treated, 78 were positive rheumatoid arthritics as measured by the latex fixation serological test and sedimentation rate and 90 were osteoarthritics because they had negative latex fixation tests.

The substance may be injected intracutaneously or intravenously at dose levels varying from about 0.0015 cc. to about 1 cc. per pound of body weight per day. Higher dosages may be used but would not appear to result in increased effectiveness. Safe and effective levels for dogs appear to be in the range of 0.18 cc. to 0.67 cc. per pound of body weight per day. Cats appear to tolerate larger doses, one cat tolerating a maximum dose of 1.1 cc. per pound without adverse reaction. A large number of healthy adult mice have tolerated 2.00 cc. given intraperitoneally daily for many weeks.

In the case of arthritis, the proper dosage for each human arthritis patient is based uopn the relief of pain and may be determined by the following procedure.

(1) If 24 hours after the injection, the patient experiences increased pain which the subsides before the next injection is due, the dosage is high and should be decreased slightly. (.01 to .05 dilution)

(2) If the day after the injection, the patient experiences relief of pain but begins to feel pain by the time the next injection is due, the dosage is too low and should be increased slightly.

(3) During the period the exact dose is being established, it is helpful if the patient will keep a daily record of stiffness and soreness.

I claim:
1. A method of treating a human rheumatoid arthritic or osteoarthritic subject which comprises injecting into said subject an effective dose of a liquid obtained in accordance with a procedure which comprises:
   (a) placing in a pressure vessel a quantity of material comprising animal tissue selected from the group consisting of fresh human placenta or other normal or malignant animal tissues;
   (b) adjusting the pH of said material to about 8;
   (c) enclosing and sealing said pressure vessel;
   (d) maintaining the temperature within said vessel within the range of about 35° C. to about 55° C., and the pressure within said vessel at about 35 p.s.i.g. over a period of about six weeks;
   (e) opening said vessel at the conclusion of said period;
   (f) recovering a liquid portion of the semi-liquid contents of said vessel; and
   (g) sterilizing the said liquid portion.
2. The method of claim 1 wherein said material additionally comprises an anti-bacterial agent.
3. The method of claim 1 wherein the recovery step (f) comprises boiling said contents to coagulate contained liquid, heat-unstable protein.
4. The method of claim 2 wherein the selected tissue is fresh human placenta.
5. The method of claim 4 wherein said anti-bacterial agent is selected from the group consisting of streptomycin, chloromycetin, penicillin and mixtures thereof,
6. The method of claim 4 wherein air is removed from said vessel and a gas providing a reducing atmosphere introduced in lieu thereof.

7. The method of claim 6 wherein said gas is selected from the group consisting of hydrogen and methyl mercaptan.

8. The method of claim 5 wherein air is removed from said vessel and a gas providing a reducing atmosphere introduced in lieu thereof.

9. The method of claim 8 wherein said gas is selected from the group consisting of hydrogen and methyl mercaptan.

10. A method for the regression of spontaneous benign and malignant neoplasms in mammalian subjects which comprises, injecting into said subjects an effective dose of a liquid obtained in accordance with a procedure which comprises:
   (a) placing in a pressure vessel a quantity of material comprising animal tissue selected from the group consisting of fresh human placenta or other normal or malignant animal tissues;
   (b) enclosing and sealing said pressure vessel;
   (c) maintaining the temperature within said vessel within the range of about 35° C. to about 55° C., and the pressure within said vessel at about 25 p.s.i.g. over a period ranging from about 2 weeks to about 3 months;
   (d) opening said vessel at the conclusion of said period;
   (e) recovering a liquid portion of the semi-liquid contents of said vessel; and
   (f) sterilizing the said liquid portion.

11. The method of claim 10 wherein the recovery step (e) comprises boiling said contents to coagulate contained liquid, heat unstable protein.

12. The method of claim 10 wherein said material additionally comprises an anti-bacterial agent.

13. The method of claim 12 wherein said selected tissue is fresh human placenta.

14. The method of claim 13 wherein said anti-bacterial agent is selected from the group consisting of steptomycin, chloromycetin, penicillin and mixtures thereof.

15. The method of claim 13 wherein air is removed from said vessel and a gas providing a reducing atmosphere is introduced in lieu thereof.

16. The method of claim 15 wherein said gas is selected from the group consisting of hydrogen and methyl mercaptan.

17. The method of claim 14 wherein air is removed from said vessel and a gas providing a reducing atmosphere is introduced in lieu thereof.

18. The method of claim 17 wherein said gas is selected from the group consisting of hydrogen and methyl mercaptan.

No references cited.

SHEP K. ROSE, Primary Examiner

U.S. Cl. X.R.

424—95